(No Model.) 2 Sheets—Sheet 2.
J. H. KEYS.
KITCHEN CABINET.

No. 518,150. Patented Apr. 10, 1894.

Witnesses
Harry L. Amer
N. W. Riley

Inventor
John H. Keys.
By his Attorneys,
C. A. Snow & Co.

UNITED STATES PATENT OFFICE.

JOHN H. KEYS, OF WEST SALEM, ILLINOIS.

KITCHEN-CABINET.

SPECIFICATION forming part of Letters Patent No. 518,150, dated April 10, 1894.

Application filed September 29, 1893. Serial No. 486,799. (No model.)

*To all whom it may concern:*

Be it known that I, JOHN H. KEYS, a citizen of the United States, residing at West Salem, in the county of Edwards and State of Illinois, have invented a new and useful Kitchen-Cabinet, of which the following is a specification.

The invention relates to improvements in kitchen cabinets.

The object of the present invention is to improve the construction of that class of kitchen cabinets which are provided with flour bins and sifters, and to provide a simple and inexpensive one in which access may be readily had to the flour bin and sifter.

The invention consists in the construction and novel combination and arrangement of parts hereinafter fully described, illustrated in the accompanying drawings and pointed out in the claims hereto appended.

Figure 1:
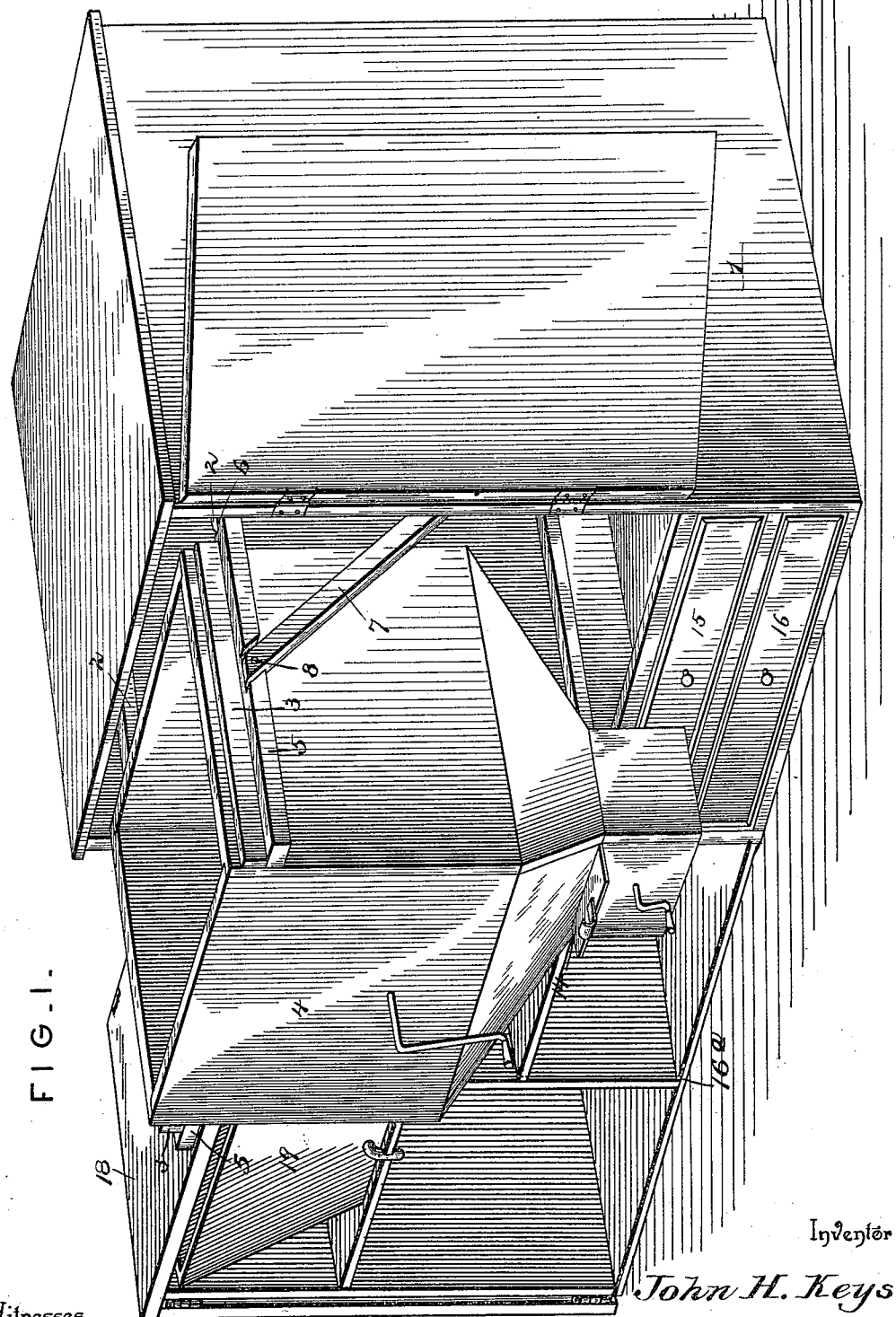
Figure 2:
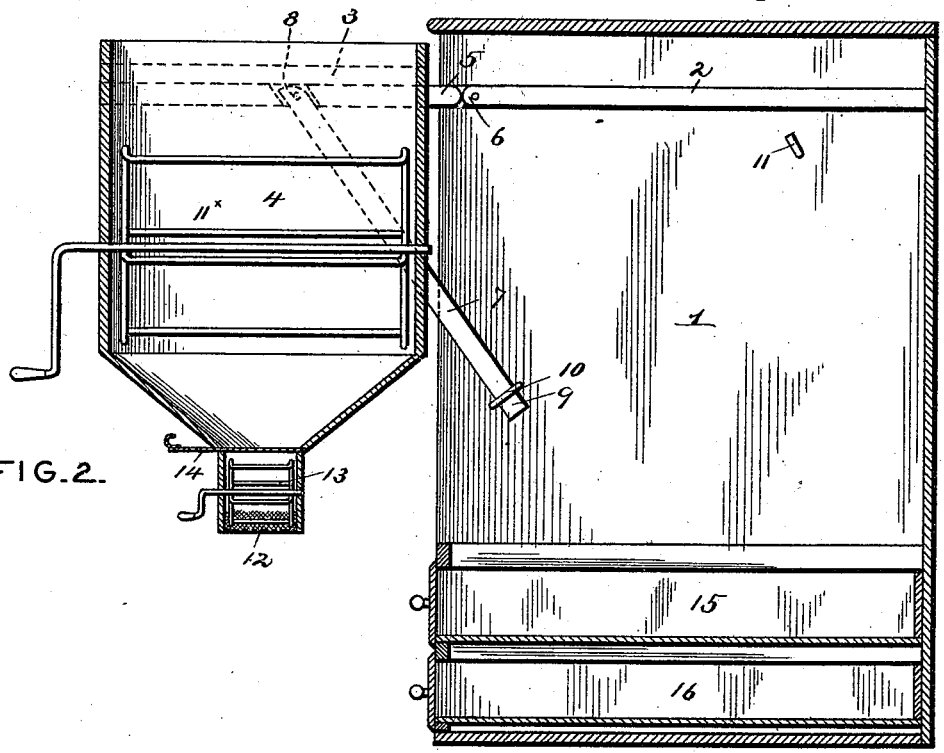
Figure 3:
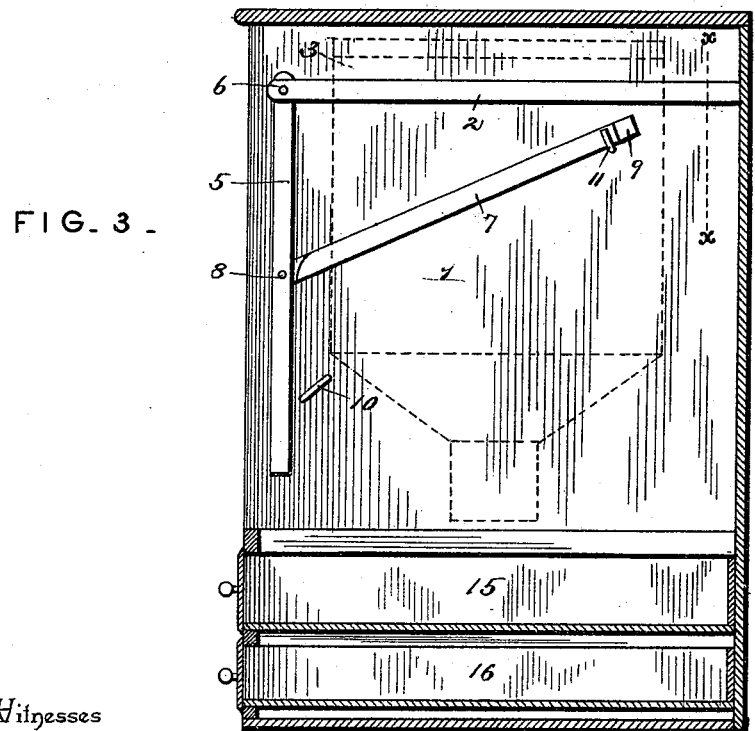
Figure 4:
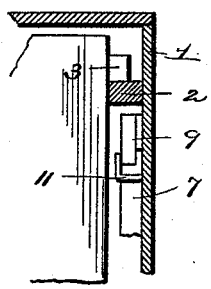

In the drawings—Figure 1 is a perspective view of a kitchen cabinet constructed in accordance with this invention, the flour bin and sifter being withdrawn from the casing and being supported upon the extensible ways. Fig. 2 is a longitudinal sectional view of the same. Fig. 3 is a longitudinal sectional view, the flour bin and sifter being arranged within the casing, and the extensible ways being folded. Fig. 4 is a detail sectional view on line $x$—$x$ of Fig. 3.

Like numerals of reference indicate corresponding parts in all the figures of the drawings.

1 designates a casing, provided at opposite sides near its top with horizontal cleats 2, forming ways and receiving cleats 3 of a flour bin 4 and slidingly supporting the latter within the casing. The casing is provided at the front terminals of the horizontal cleats 2 with folding bars 5, which are pivoted at 6, and which are adapted to be supported in a horizontal position by braces 7 to form continuations of the cleats or ways 2 to enable the flour bins to be withdrawn from the casing and to be supported outside thereof as illustrated in Figs. 1 and 2 of the accompanying drawings. Each brace 7 is pivoted at its outer end 8 to the adjacent bar 5, and its other end 9 is reduced, and is adapted to be stepped in staples 10 of the casing, whereby the pivoted folding bar 5 is securely retained and supported in a horizontal position. When the pivoted folding bars are not in use, they are swung down to a vertical position within the casing, and the braces 7 are supported at an inclination by L-shaped keepers, catches or supports 11, which are secured to opposite sides of the casing and are located below the cleats or ways 2. The supports or catches 11 which are L-shaped are open at the top to enable the braces 7 to be readily engaged with them.

The bin or flour receptacle 4 is provided at its front and rear with handles, and has journaled in it an agitator $11^\times$ to prevent the flour from becoming lumpy. At the bottom of the receptacle is arranged a sieve 12, in which is mounted a similar but smaller agitator 13 than the one before described; and the slide 14 is provided as a cut-off for the flour to prevent the same entering the sifter when desired.

A drawer 15 is arranged below the sifter for catching the sifted flour when the bin or flour receptacle is arranged within the casing; but when the flour bin is supported outside of the casing any suitable receptacle may be employed for receiving the sifted flour. A lower drawer 16 is arranged beneath the upper drawer 15, and may be used for any desired purpose.

The casing 1 is provided with an extension $16^a$ having a hinged door 17, and provided with a hinged top 18, which is adapted to serve as a kneading board. The extension $16^a$ of the casing is adapted to contain various kitchen utensils, such as a dripping pan 19 and the like.

It will readily be seen that the flour bin or receptacle is capable of being quickly arranged without the casing, and is capable of being compactly folded therein, and that the supports for the flour bin fold within the casing and do not necessitate an increase of the size of the same to accommodate the flour bin when moved outward.

Changes in the form, proportion and the minor details of construction may be resorted to without departing from the principle or sacrificing any of the advantages of this invention.

What I claim is—

1. The combination of a casing provided near its top at opposite sides with horizontal cleats 2 forming ways, a flour bin or receptacle provided at opposite sides of the upper end with horizontal cleats resting upon those of the casing, and suspending the bin or receptacle therefrom and forming spaces at opposite sides of the bin or receptacle, keepers arranged on the inner faces of the sides of the casing and located at the front and back of the latter, the vertically swinging folding bars pivoted to the outer ends of the cleats 2 and arranged to fold and be concealed in the spaces at the opposite sides of the bin or receptacle, and the horizontal braces pivoted at their outer ends to the folding bars at points intermediate of the ends of the latter and having their lower or inner ends fitted in the front or rear keepers, substantially as described.

2. The combination of a casing provided at opposite sides near the top with horizontal cleats 2, a bin or receptacle suspended from the cleats 2 and provided with cleats 3 resting thereon, the upper and lower L-shaped keepers or supports 10 and 11 arranged at the front and back of the casing at opposite sides thereof, the vertically swinging folding bars pivoted to the outer extremities of the cleats 2 and forming horizontal continuations of the cleats 2 and adapted to swing downward and be concealed in the spaces at the sides of the bin or receptacle, and the folding braces pivoted at their outer extremities to said bars and having their lower or inner extremities shouldered and engaging either the upper or lower keepers or supports, substantially as and for the purpose described.

In testimony that I claim the foregoing as my own I have hereto affixed my signature in the presence of two witnesses.

JOHN H. KEYS.

Witnesses:
EDWARD SCHULER,
MARGRET HARMS.